United States Patent
Ikemura et al.

(10) Patent No.: US 12,442,775 B2
(45) Date of Patent: Oct. 14, 2025

(54) MEASURING DEVICE

(71) Applicant: HAMAMATSU PHOTONICS K.K., Hamamatsu (JP)

(72) Inventors: Kenichiro Ikemura, Hamamatsu (JP); Kengo Suzuki, Hamamatsu (JP); Kazuya Iguchi, Hamamatsu (JP); Akihiro Nakamura, Hamamatsu (JP)

(73) Assignee: HAMAMATSU PHOTONICS K.K., Hamamatsu (JP)

( * ) Notice: Subject to any disclaimer, the term of this patent is extended or adjusted under 35 U.S.C. 154(b) by 5 days.

(21) Appl. No.: 18/285,281

(22) PCT Filed: Feb. 18, 2022

(86) PCT No.: PCT/JP2022/006758
§ 371 (c)(1),
(2) Date: Oct. 2, 2023

(87) PCT Pub. No.: WO2022/264520
PCT Pub. Date: Dec. 22, 2022

(65) Prior Publication Data
US 2024/0183795 A1 Jun. 6, 2024

(30) Foreign Application Priority Data
Jun. 18, 2021 (JP) ................. 2021-101390

(51) Int. Cl.
*G01N 21/95* (2006.01)
(52) U.S. Cl.
CPC ... *G01N 21/9505* (2013.01); *G01N 2201/065* (2013.01)

(58) Field of Classification Search
CPC .............. G01N 21/95; G01N 21/9501; G01N 21/9505; G01N 2201/065
See application file for complete search history.

(56) References Cited

U.S. PATENT DOCUMENTS

| | | | |
|---|---|---|---|
| 5,757,474 A | 5/1998 | Sopori et al. | |
| 8,592,780 B2 | 11/2013 | Iguchi | |
| 9,423,339 B2 * | 8/2016 | Eura | G01J 3/0291 |

FOREIGN PATENT DOCUMENTS

| | | |
|---|---|---|
| CN | 108169135 A | 6/2018 |
| CN | 109030427 A | 12/2018 |

(Continued)

OTHER PUBLICATIONS

Extended European Search Report issued on Feb. 12, 2025 in corresponding European patent application 22824520.5 (8 pages).

(Continued)

*Primary Examiner* — Kevin K Pyo
(74) *Attorney, Agent, or Firm* — Faegre Drinker Biddle & Reath LLP

(57) ABSTRACT

A measuring device includes: an integrating sphere; an excitation optical system; a light detector; and a first detection optical system. The optical axis of the excitation light incident on the subject to be measured in the integrating sphere in the excitation optical system and the optical axis of the light to be measured that is emitted from the integrating sphere in the first detection optical system obliquely intersect with each other, the first detection optical system has an opening portion that limits a detection range of the light to be measured in the light detector, and an irradiation spot of the excitation light on the subject to be measured and the opening portion are in an optically conjugate relationship.

7 Claims, 16 Drawing Sheets

(56) References Cited

FOREIGN PATENT DOCUMENTS

| EP | 2647981 A1 | 10/2013 |
| JP | H09-043147 A | 2/1997 |
| JP | 2012-168159 A | 9/2012 |
| JP | 2013-519079 A | 5/2013 |
| JP | 2016-017876 A | 2/2016 |
| JP | 2019-211244 A | 12/2019 |
| WO | WO-2011/095752 A1 | 8/2011 |

OTHER PUBLICATIONS

Kojima Kazunobu et al, "Quantification of the quantum efficiency of radiation of a freestanding GaN crystal placed outside an integrating sphere", Applied Physics Express, May 23, 2019, p. 062010-1-p. 062010-4, XP055907070.

Kojima, Kazunobu et al., "Demonstration of omnidirectional photoluminescence (ODPL) spectroscopy for precise determination of internal quantum efficiency of radiation in GaN single crystals," Applied Physics Letters 111, 032111 (2017), Jul. 21, 2017.

Kojima, Kazunobu et al., "Determination of absolute value of quantum efficiency of radiation in high quality GaN single crystals using an integrating sphere," Journal of Applied Physics 120, 015704 (2016), Jul. 7, 2016.

International Preliminary Report on Patentability mailed Dec. 28, 2023 for PCT/JP2022/006758.

* cited by examiner

MEASURING DEVICE

TECHNICAL FIELD

The present disclosure relates to a measuring device.

BACKGROUND ART

As a measurement method used for inspecting subjects to be measured such as semiconductor wafers, for example, photoluminescence measurement (hereinafter referred to as "PL measurement") is known. PL measurement is, for example, a method of measuring light emitted by recombination of electrons and holes generated by irradiating a semiconductor material with light having energy higher than a bandgap. In the related art, the quality of a subject to be measured has been evaluated on the basis of intensity and information for each wavelength of PL, but from the viewpoint of ensuring the quality of semiconductor wafers, improvements in quantification of defects and reproducibility are required.

As another measurement method, omnidirectional photoluminescence measurement (hereinafter referred to as "ODPL measurement") is known (see, for example, Non-Patent Literature 1). ODPL measurement is a method of measuring the number of photons of excitation light absorbed by a subject to be measured and the number of luminescence photons in all directions using an integrating sphere. ODPL measurement enables the quantification of defects because it enables the luminescence quantum efficiency of band edge luminescence that is affected by non-radiative recombination including impurity density, point defect density, and the like to be calculated.

In ODPL measurement, as a preliminary step, the measurement of the external quantum efficiency (EQE) of the subject to be measured is executed using an integrating sphere. Further, as a later step, the calculation of the internal quantum efficiency (IQE) of the subject to be measured is executed using a standard PL spectrum of the subject to be measured. The external quantum efficiency is a ratio of the number of luminescence photons emitted to the outside of the subject to be measured to the number of photons of the excitation light absorbed by the subject to be measured. The internal quantum efficiency is a ratio of the number of luminescence photons generated at the subject to be measured to the number of photons of the excitation light absorbed by the subject to be measured.

Since the external quantum efficiency is obtained by considering the effect of the light extraction efficiency from the subject to be measured on the internal quantum efficiency, if the standard PL spectrum and the external quantum efficiency of the subject to be measured are obtained, the internal quantum efficiency of the subject to be measured can be calculated. For example, in GaN crystals, there is a tendency of higher internal quantum efficiency when the crystallinity is higher and the number of defects of a material is smaller (see Non-Patent Literature 1). In other words, the internal quantum efficiency directly reflects the crystalline quality of a material, and by evaluating the crystalline quality of a wafer material during wafer manufacturing, it is possible to evaluate the factors that affect device life and performance.

CITATION LIST

Non-Patent Literature

[Non-Patent Literature 1] "Demonstration of omnidirectional photoluminescence (ODPL) spectroscopy for precise determination of internal quantum efficiency of radiation in GaN single crystals" Kazunobu Kojima et al., Applied Physics Letter 111, 032111 (2017)

[Non-Patent Literature 2] "Determination of absolute value of quantum efficiency of radiation in high quality GaN single crystals using an integrating sphere" Kazunobu Kojima et al., Journal of Applied Physics 120, 015704 (2016)

SUMMARY OF INVENTION

Technical Problem

Measurement using an integrating sphere involves detecting light incident on the integrating sphere and omnidirectional light generated from a subject to be measured. For this reason, when the measurement of the standard PL spectrum of the subject to be measured is executed, the integrating sphere is generally not used (see, for example, Non-Patent Literature 2). However, in executing ODPL measurement, from the viewpoint of convenience of measurement, it is preferable that executing the measurement of the standard PL spectrum of the subject to be measured be possible in a state where the subject to be measured is disposed in the integrating sphere.

The present disclosure has been made to solve the above problems, and an object of the present disclosure is to provide a measuring device capable of executing the measurement of a standard PL spectrum of a subject to be measured in a state where the subject to be measured is disposed in an integrating sphere.

Solution to Problem

According to an aspect of the present disclosure, there is provided a measuring device including: an integrating sphere with a subject to be measured disposed therein; an excitation optical system configured to guide excitation light toward the subject to be measured disposed in the integrating sphere; a light detector configured to detect light to be measured generated at the subject to be measured in the integrating sphere through irradiation with the excitation light; and a first detection optical system configured to guide the light to be measured from the integrating sphere toward the light detector, wherein an optical axis of the excitation light incident on the subject to be measured in the integrating sphere in the excitation optical system and an optical axis of the light to be measured that is emitted from the integrating sphere in the first detection optical system obliquely intersect with each other, wherein the first detection optical system has an opening portion that limits a detection range of the light to be measured in the light detector, and wherein an irradiation spot of the excitation light on the subject to be measured and the opening portion are in an optically conjugate relationship.

In the measuring device, the optical axis of the excitation light incident on the subject to be measured in the integrating sphere in the excitation optical system and the optical axis of the light to be measured that is emitted from the integrating sphere in the first detection optical system obliquely intersect with each other. As a result, the excitation light reflected by the subject to be measured in the integrating sphere can be prevented from being directly detected by the light detector. Further, in this measuring device, the irradiation spot of the excitation light on the subject to be measured disposed in the integrating sphere and the opening portion disposed in the first detection optical system are in an optically conjugate relationship. As a result, the influence of multiple scattering within the integrating sphere can be suppressed, and only the light to be measured generated on the surface of the subject to be measured through the incidence of the excitation light can be extracted from the integrating sphere to be detected. Therefore, in the measuring device, it is possible to execute the measurement of the standard PL spectrum of the subject to be measured in a state where the subject to be measured is disposed in the integrating sphere.

The excitation light directed toward the subject to be measured by the excitation optical system and the light to be measured generated at the subject to be measured in the integrating sphere may pass through the same port of the integrating sphere. In this case, it becomes easy to share the optical components constituting the excitation optical system and the first detection optical system, and it is possible to achieve the simplification and miniaturization of the device.

The excitation light directed toward the subject to be measured by the excitation optical system may pass through one port of the integrating sphere, and the light to be measured generated at the subject to be measured in the integrating sphere may pass through another port that is different from the one port of the integrating sphere. In this case, it is easy to secure the oblique intersection angle of the optical axis of the excitation light incident on the subject to be measured in the integrating sphere in the excitation optical system and the optical axis of the light to be measured that is emitted from the integrating sphere in the first detection optical system. Therefore, the excitation light reflected by the subject to be measured in the integrating sphere can be more reliably prevented from being directly detected by the light detector.

The first detection optical system may have a blocking member that blocks stray light of the light to be measured. In this case, it is possible to prevent the stray light of the light to be measured from affecting the optical components constituting the excitation optical system and the first detection optical system.

The blocking member may be constituted by a cylindrical member. In this case, the stray light of the light to be measured can be blocked with a simple configuration.

The measuring device may further include: a second detection optical system configured to guide the light to be measured diffusely reflected in the integrating sphere from the integrating sphere toward the light detector; and a switching unit configured to optically connect one of the first detection optical system and the second detection optical system to the light detector. In this case, the second detection optical system is used to guide the light to be measured diffusely reflected in the integrating sphere from the integrating sphere toward the light detector, and thus it is possible to execute the measurement of the external quantum efficiency of the subject to be measured using the integrating sphere. By switching the optical system connected to the light detector by the switching unit, it is possible to execute the measurement of the standard PL spectrum and the measurement of the external quantum efficiency in the same device while maintaining the state where the subject to be measured is disposed in the integrating sphere.

The switching unit may include an attenuation element disposed to move back and forth on the optical axis of the light to be measured. In this case, saturation of the light to be measured in the light detector can be preferably prevented.

Advantageous Effects of Invention

According to the present disclosure, it is possible to execute the measurement of a standard PL spectrum of a subject to be measured in a state where the subject to be measured is disposed in an integrating sphere.

DESCRIPTION OF EMBODIMENTS

Hereinafter, a preferred embodiment of a measuring device according to an aspect of the present disclosure will be described in detail with reference to the drawings.

Outline of Measuring Device

Figure 1:
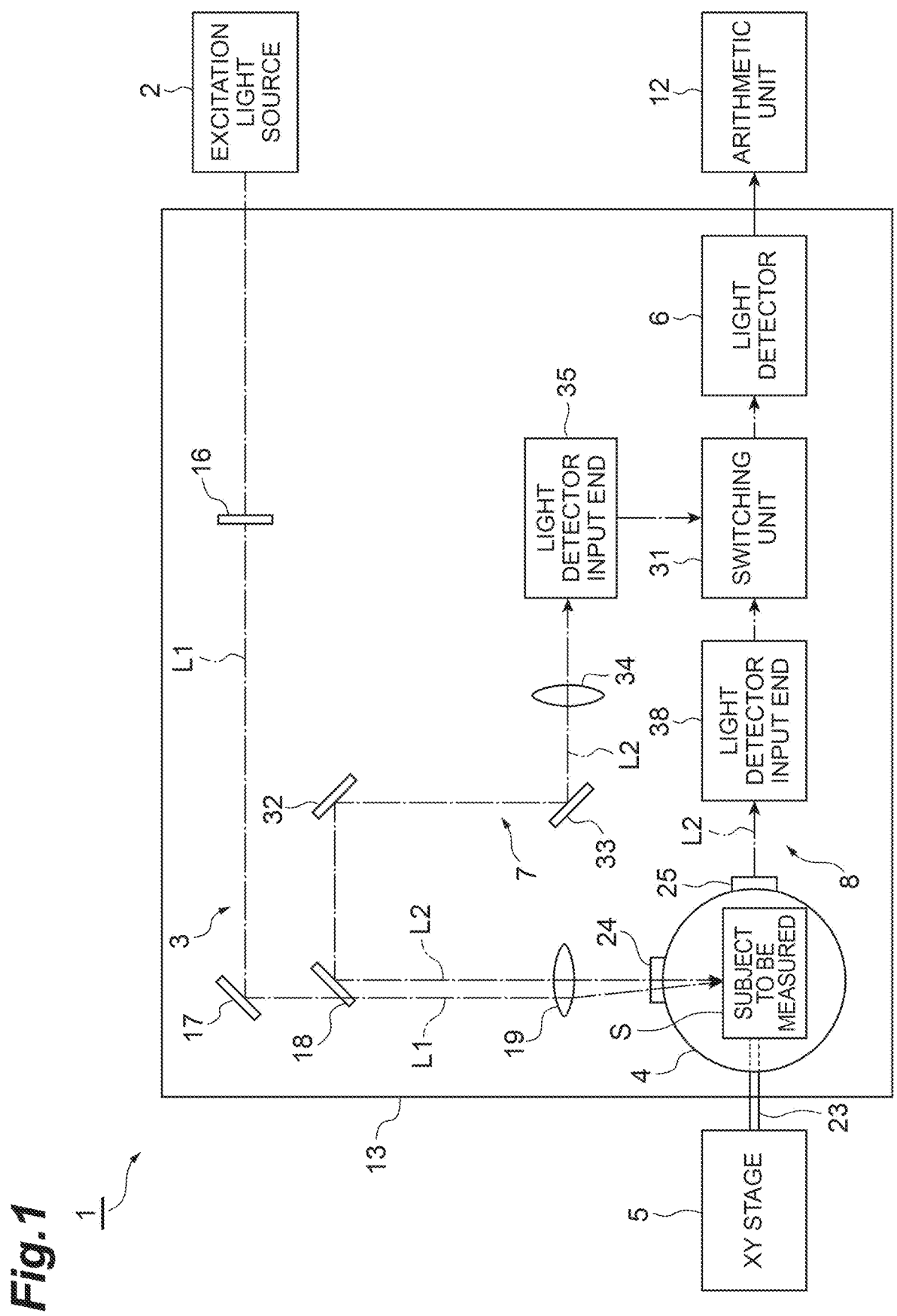
FIG. 1 is a schematic view showing a configuration of a measuring device according to an embodiment of the present disclosure.

FIG. 1 is a schematic view showing a configuration of a measuring device according to an embodiment of the present disclosure. A measuring device 1 shown in FIG. 1 is configured as a device for performing a non-destructive inspection of a subject to be measured S, for example. In the present embodiment, compound semiconductor crystals are exemplified as the subject to be measured S. More specifically, the subject to be measured S is gallium nitride (GaN) semiconductor crystals. The GaN semiconductor is a material expected to be applied to visible/ultraviolet light emitting devices, high frequency devices, and power devices. It is known that the characteristics of devices using the GaN semiconductor are greatly affected by structural defects such as threading dislocations, point defects, and contamination with trace impurities. The measuring device 1 is configured as a device for inspecting both the distribution of structural defects and the quantification of defects in GaN semiconductor crystals in order to improve the yield of devices and promote mass production.

In the measuring device 1, in inspecting the distribution of structural defects and the quantification of defects in the GaN semiconductor crystals, omnidirectional photoluminescence measurement (hereinafter referred to as "ODPL measurement") is executed on the subject to be measured S. In ODPL measurement, as a preliminary step, the measurement of the external quantum efficiency (EQE) of the subject to be measured S is executed using an integrating sphere. Further, as a later step, the calculation of the internal quantum efficiency (IQE) of the subject to be measured S is executed using a standard photoluminescence spectrum (hereinafter referred to as a "standard PL spectrum") of the subject to be measured S.

Figure 2:
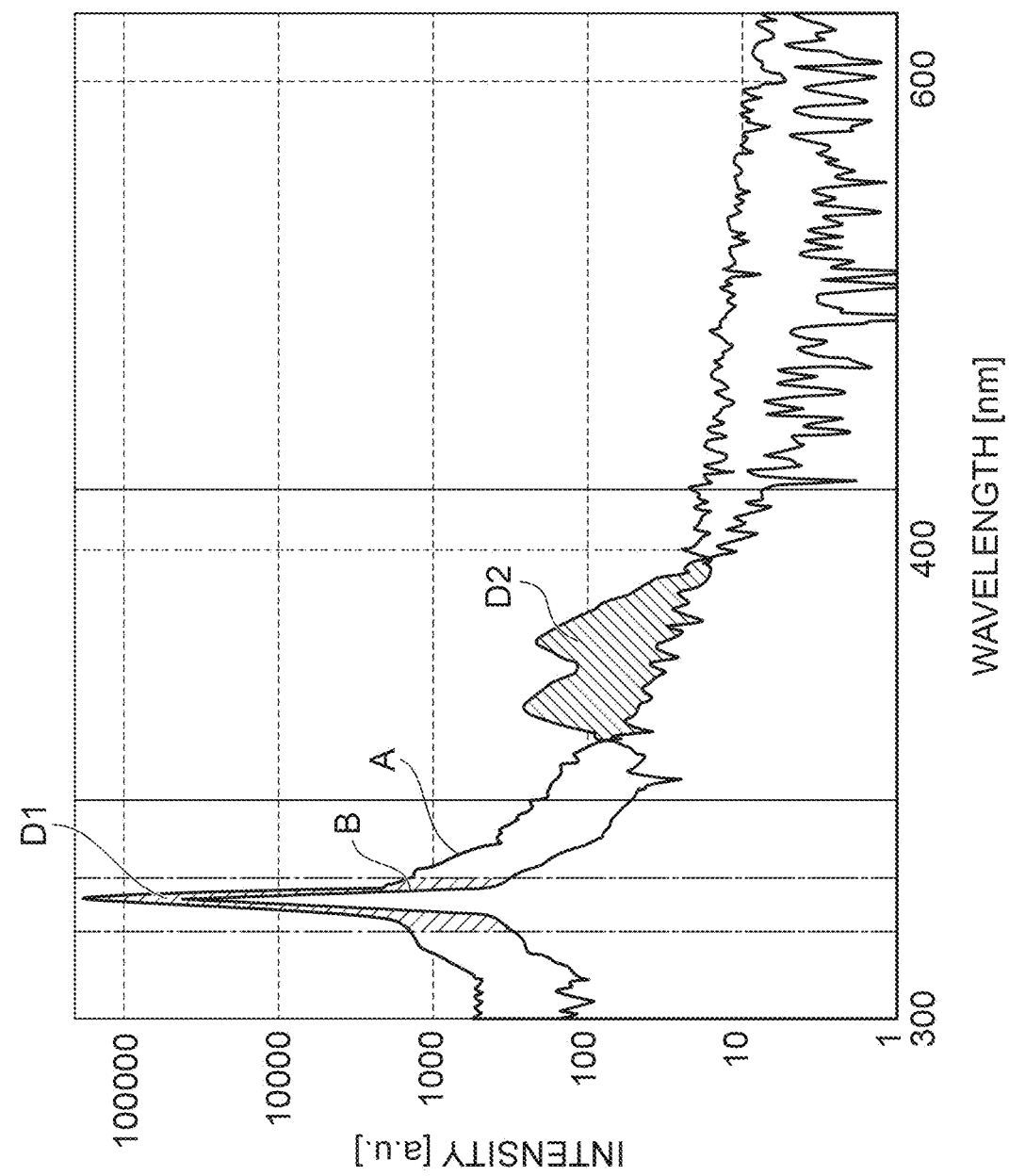
FIG. 2 is a diagram showing a method of calculating external quantum efficiency.

The external quantum efficiency is a ratio of the number of luminescence photons emitted to the outside of the subject to be measured to the number of photons of the excitation light absorbed by the subject to be measured. A graph shown in FIG. 2 shows a spectrum of light to be measured output from the integrating sphere in a case where the excitation light is input to the integrating sphere with no sample disposed in the integrating sphere (a graph A in FIG. 2), and a spectrum of the light to be measured output from the integrating sphere in a case where the excitation light is input to the integrating sphere with a sample disposed in the integrating sphere (a graph B in FIG. 2). The number of photons of the excitation light absorbed by the subject to be measured corresponds to a difference between the spectrum of the graph A and the spectrum of the graph B (a region D1 in FIG. 2) in a wavelength region of the excitation light. The number of luminescence photons emitted to the outside of the subject to be measured corresponds to a difference between the spectrum of the graph A and the spectrum of the graph B (a region D2 in FIG. 2) in a luminescence wavelength region of the light to be measured.

The internal quantum efficiency is a ratio of the number of luminescence photons generated at the subject to be measured to the number of photons of the excitation light absorbed by the subject to be measured. The external quantum efficiency is obtained by considering the effect of the light extraction efficiency from the subject to be measured on the internal quantum efficiency. The light extraction efficiency from the subject to be measured is a known value determined for a material of the subject to be measured. For example, the light extraction efficiency of the GaN crystals is estimated to be 2.55% (see Non-Patent Literature 2 described above).

Therefore, if the standard PL spectrum and the external quantum efficiency of the subject to be measured S are obtained, the internal quantum efficiency of the subject to be measured S can be derived. For example, in the GaN crystals, there is a tendency of higher internal quantum efficiency when the crystallinity is higher and the number of defects of a material is smaller (see Non-Patent Literature 1 described above, for example). In other words, the internal quantum efficiency directly reflects the crystalline quality of a material, and by evaluating the crystalline quality of a wafer material during wafer manufacturing, it is possible to evaluate the factors that affect device life and performance.

Figure 3:
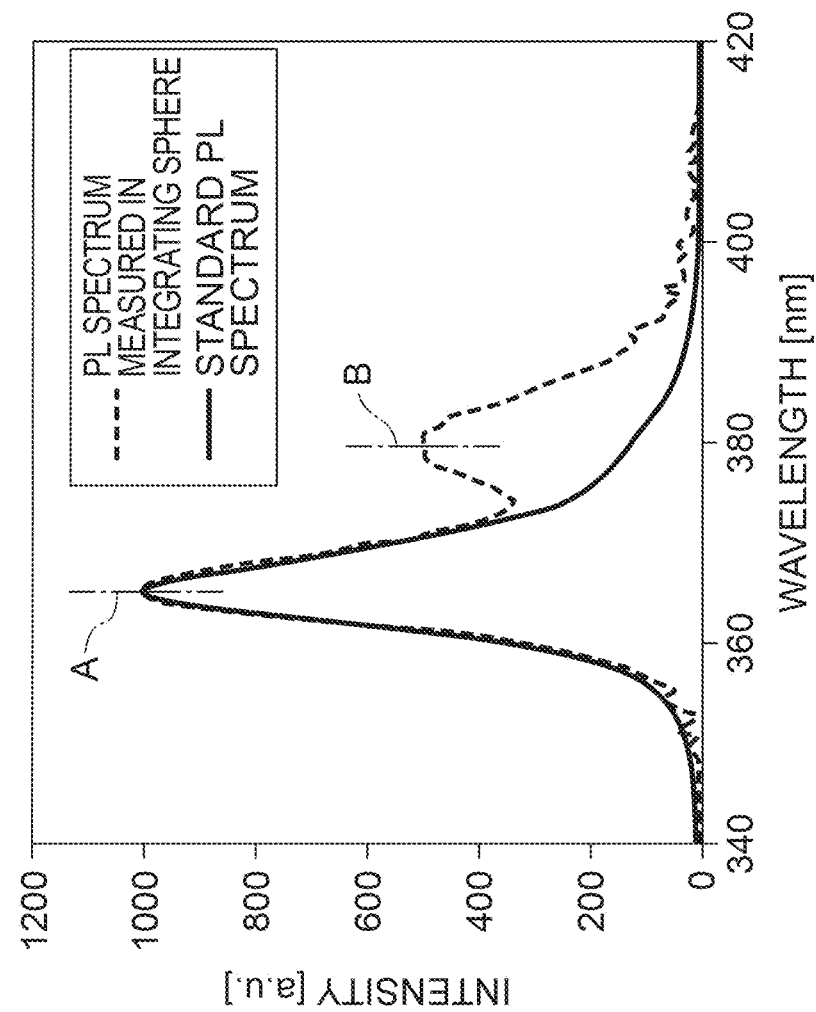
FIG. 3 is a diagram showing an example of a standard PL spectrum.

Calculation of the internal quantum efficiency requires measurement of a standard PL spectrum of the subject to be measured. Measurement using an integrating sphere involves detecting light incident on the integrating sphere and omnidirectional light generated from the subject to be measured. In a case where it is tried to execute the measurement of the standard PL spectrum using the integrating sphere, for example, as shown in FIG. 3, in order to detect omnidirectional photoluminescence, a spectral peak (a peak B in FIG. 3) is generated in addition to the original peak of the standard PL spectrum (a peak A in FIG. 3). For this reason, when the measurement of the standard PL spectrum of the subject to be measured is executed, the integrating sphere is generally not used. On the other hand, in the measuring device 1, from the viewpoint of convenience of measurement, a configuration is devised such that executing the measurement of the standard PL spectrum of the subject to be measured S be possible in a state where the subject to be measured S is disposed in the integrating sphere. A configuration of this measuring device 1 will be described in detail below.

Configuration of Measuring Device

As shown in FIG. 1, the measuring device 1 includes an excitation light source 2, an excitation optical system 3, an integrating sphere 4, an XY stage 5, a light detector 6, a first detection optical system 7, a second detection optical system 8, and an arithmetic unit 12. In the present embodiment, the excitation optical system 3, the integrating sphere 4, the light detector 6, the first detection optical system 7, and the second detection optical system 8 are accommodated in a housing 13 made of a member such as a metal. The excitation light source 2, the XY stage 5, and the arithmetic unit 12 are externally attached to the housing 13.

The excitation light source 2 is a device that outputs excitation light L1 to the subject to be measured S. The excitation light source 2 may be either a coherent light source or an incoherent light source. As the coherent light source, for example, an excimer laser (wavelength: 193 nm), a YAG laser second harmonic wave (wavelength: 532 nm), a YAG laser fourth harmonic wave (wavelength: 266 nm), a semiconductor laser (for example, an InGaN semiconductor laser (wavelength: 375 nm to 530 nm), a red semiconductor laser, an infrared semiconductor laser), a semiconductor excitation all-solid-state UV laser (wavelength: 320 nm), a HeCd laser (wavelength: 325 nm), or the like can be used. As the incoherent light source, for example, a mercury lamp (wavelength: 365 nm), an LED light source, or the like can be used. The excitation light L1 output from the excitation light source 2 may be either pulsed light or CW light. In a case where the subject to be measured S is the GaN semiconductor crystals, as the excitation light source 2, for example, the YAG laser fourth harmonic wave (wavelength: 266 nm), the semiconductor excitation all-solid-state UV laser (wavelength: 320 nm), or the HeCd laser (wavelength: 325 nm) of the above light sources is used.

The excitation optical system 3 is an optical system that guides the excitation light L1 toward the subject to be measured S. The excitation optical system 3 includes a variable attenuation filter 16, a mirror 17, a separation optical element 18, and a lens 19, for example. The variable attenuation filter 16 is an element for changing the intensity of the excitation light L1 with which the subject to be measured S is irradiated and adjusts the intensity of the excitation light L1 directed toward the subject to be measured S.

Figure 4:
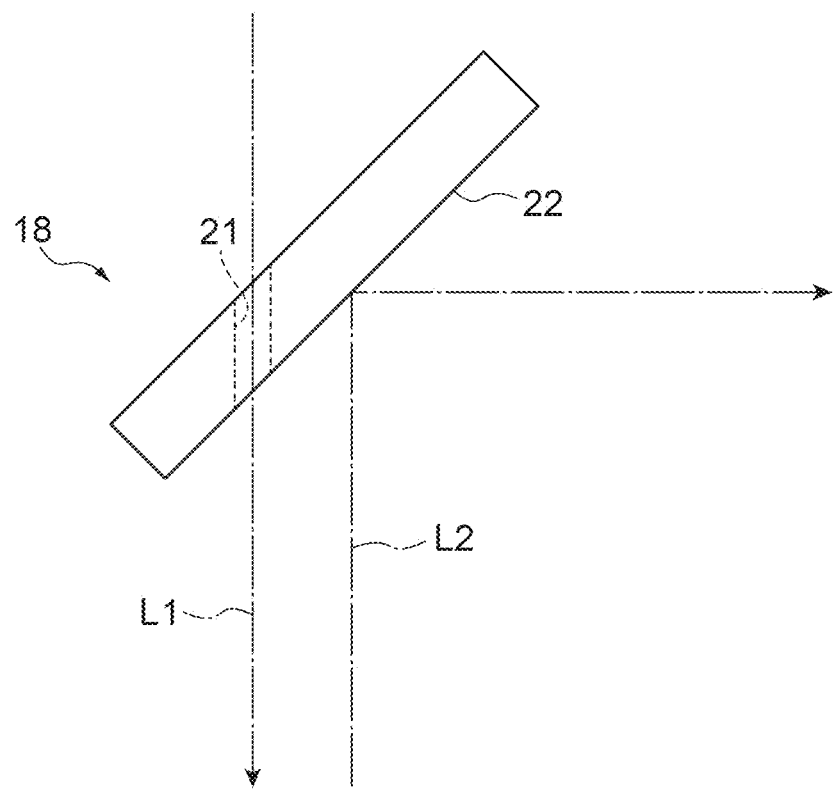
FIG. 4 is a schematic view showing an example of a configuration of a separation optical element.

The separation optical element 18 is an element that separates an optical axis of the excitation light L1 directed toward the subject to be measured S and an optical axis of the light to be measured L2 generated at the subject to be measured S through the irradiation with the excitation light L1 from each other. In the present embodiment, as shown in FIG. 4, the separation optical element 18 is constituted by a so-called perforated mirror and has an opening portion 21 through which the excitation light L1 passes and a reflecting surface 22 for reflecting the light to be measured L2, which will be described below. On the reflecting surface 22, the light to be measured L2 is reflected at a position shifted from the opening portion 21. As a result, the optical axis of the excitation light L1 directed toward the subject to be measured S and the optical axis of the light to be measured L2 output from the integrating sphere 4 and directed toward the light detector 6 are separated from each other.

The lens 19 is constituted by, for example, a convex lens. The lens 19 converges the excitation light L1 directed toward the integrating sphere 4 onto the surface of the subject to be measured S. That is, the lens 19 forms an irradiation spot La (see FIG. 5) of the excitation light L1 on the subject to be measured S in the integrating sphere 4. Further, the lens 19 collimates the light to be measured L2 from the integrating sphere 4.

The integrating sphere 4 is a device that spatially integrates light by diffusely reflecting the light on the sphere inner wall to which a reflective coating is applied. The shape of the integrating sphere 4 is not limited to spherical and may be hemispherical. The subject to be measured S is disposed inside the integrating sphere 4. In the present embodiment, the tip end portion of an arm 23 connected to the XY stage 5 extends inside the integrating sphere 4, and the tip end portion of the arm 23 holds the subject to be measured S. As a result, the subject to be measured S can be scanned inside the integrating sphere 4 in an XY plane direction.

The integrating sphere 4 has a first port 24 and a second port 25. The first port 24 opens in a direction orthogonal to the scanning plane (the XY plane) of the subject to be measured S scanned by the XY stage 5. The second port 25 opens in a direction (an X direction or a Y direction) orthogonal to the opening direction of the first port 24. In the present embodiment, the first port 24 is a port for standard PL spectrum measurement, and the second port 25 is a port for external quantum efficiency measurement. In the standard PL spectrum measurement, the excitation light L1 directed toward the subject to be measured S by the excitation optical system 3 and the light to be measured L2 generated at the subject to be measured S in the integrating sphere 4 both pass through the first port 24 of the integrating sphere 4. In the external quantum efficiency measurement, the excitation light L1 directed toward the subject to be measured S by the excitation optical system 3 passes through the first port 24, and the light to be measured L2 diffusely reflected in the integrating sphere 4 passes through the second port 25.

The light detector 6 is a device that detects the light to be measured L2 generated at the subject to be measured S in the integrating sphere 4 through the irradiation with the excitation light L1. The light detector 6 is optically connected to one of the first detection optical system 7 and the second detection optical system 8 via a switching unit 31. As the light detector 6, for example, a CMOS, a CCD, an EM-CCD, a photomultiplier tube, an SiPM (a MPPC), an APD (an SPAD), a photodiode (including an array type), or the like can be used. In the present embodiment, the light detector 6 is constituted by a BT-CCD (a multi-channel light detector incorporating a back surface incidence type CCD) therein.

The light detector 6 outputs a signal based on the detection result to the arithmetic unit 12. The light detector 6 may incorporate an element (for example, a variable attenuation filter) for suppressing saturation of the light to be measured L2.

The first detection optical system 7 is an optical system that guides the light to be measured L2 from the integrating sphere 4 toward the light detector 6 in the standard PL spectrum measurement. The first detection optical system 7 includes a dichroic mirror 32, a mirror 33, and a lens 34 in addition to the lens 19 and the separation optical element 18 which are common to the excitation optical system 3. The light to be measured L2 output from the first port 24 of the integrating sphere 4 is guided by the first detection optical system 7 and input to the light detector 6 via a light detector input end 35.

Figure 5:
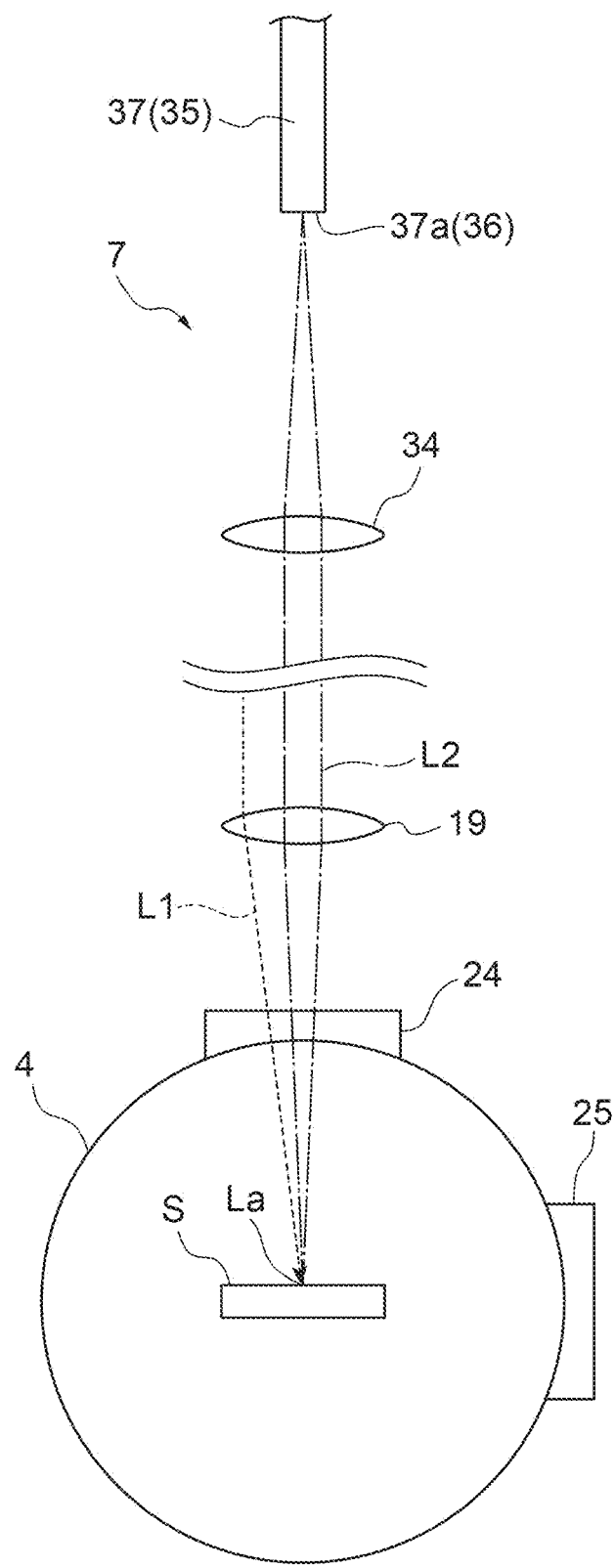
FIG. 5 is a schematic view showing an optical connection state between an excitation optical system and a first detection optical system in standard PL spectrum measurement.

FIG. 5 is a schematic view showing an optical connection state between the excitation optical system and the first detection optical system in the standard PL spectrum measurement. As shown in FIG. 5, in the standard PL spectrum measurement, in executing the measurement of the standard PL spectrum in a state where the subject to be measured S is disposed in the integrating sphere 4, the optical axis of the excitation light L1 directed toward the subject to be measured S and the optical axis of the light to be measured L2 generated at the subject to be measured S through the irradiation with the excitation light L1 are separated from each other by the separation optical element 18 described above. For this reason, the optical axis of the excitation light L1 incident on the subject to be measured S in the integrating sphere 4 via the lens 19 in the excitation optical system 3 and the optical axis of the light to be measured L2 that is emitted from the integrating sphere 4 in the first detection optical system 7 obliquely intersect with each other at a certain angle.

In the example of FIG. 5, the optical axis of the excitation light L1 incident on the subject to be measured S is inclined with respect to the surface of the subject to be measured S (the XY plane), and the optical axis of the light to be measured L2 is perpendicular to the surface of the subject to be measured S (the XY plane). In a case of considering the light distribution characteristics of the light to be measured L2 generated from the subject to be measured S, a mode in which the PL component on a normal line can be measured as shown in FIG. 5 is the optimum arrangement for performing the standard PL measurement. In a case where the optical axis of the light to be measured L2 is perpendicular to the surface of the subject to be measured S, it is possible to keep the entire subject to be measured S within the range of the depth of field (in focus), and it is least susceptible to aberrations from the lens and the like. On the other hand, the optical axis of the excitation light L1 may be perpendicular to the surface of the subject to be measured S. In this case, the optical axis of the light to be measured L2 is inclined with respect to the surface of the subject to be measured S, but by using a shift lens or a tilt lens in the excitation optical system 3, it is possible to keep the entire subject to be measured S within the range of the depth of field, and it is possible to measure the PL component. In this way, the optical axis of the excitation light L1 and the optical axis of the light to be measured L2 obliquely intersect with each other, and thus the excitation light L1 reflected by the subject to be measured S in the integrating sphere 4 can be prevented from being directly detected by the light detector 6.

The first detection optical system 7 is provided with an opening portion 36 that limits a detection range of the light to be measured L2 in the light detector 6. In the present embodiment, the light detector 6 is a fiber input type detector. Further, the light detector input end 35 is constituted by a bundle fiber 37 in which the strands of optical fibers are bundled. Therefore, in the present embodiment, an end surface 37a of the bundle fiber 37 corresponds to the opening portion 36 that limits the detection range of the light to be measured L2 in the light detector 6.

As shown in FIG. 5, the excitation light L1 directed toward the subject to be measured S is converged by the lens 19 and forms an image on the surface of the subject to be measured S. The light to be measured L2 generated at the subject to be measured S through the irradiation with the excitation light L1 is collimated by the lens 19, then is converged by the lens 34, and forms an image on the end surface 37a (the opening portion 36) of the bundle fiber 37. That is, the irradiation spot La of the excitation light L1 on the subject to be measured S and the opening portion 36 are in an optically conjugate relationship. Since the irradiation spot La and the opening portion 36 are in an optically conjugate relationship, the influence of multiple scattering within the integrating sphere 4 can be suppressed, and only the light to be measured L2 generated on the surface of the subject to be measured S through the incidence of the excitation light L1 can be extracted from the integrating sphere 4 to be detected. Therefore, in the measuring device 1, it is possible to execute the measurement of the standard PL spectrum of the subject to be measured S in a state where the subject to be measured S is disposed in the integrating sphere 4.

The second detection optical system 8 is an optical system that guides the light to be measured L2 diffusely reflected in the integrating sphere 4 from the integrating sphere 4 toward the light detector 6 in the external quantum efficiency measurement. In the second detection optical system 8, the light to be measured L2 output from the second port 25 of the integrating sphere 4 is input to the light detector 6 via a light detector input end 38 that is separate from the first detection optical system 7. The light detector input end 38 is constituted by, for example, a bundle fiber 39 (see FIG. 6) in which the strands of optical fibers are bundled, similarly to the light detector input end 35 of the first detection optical system 7.

Figure 6:
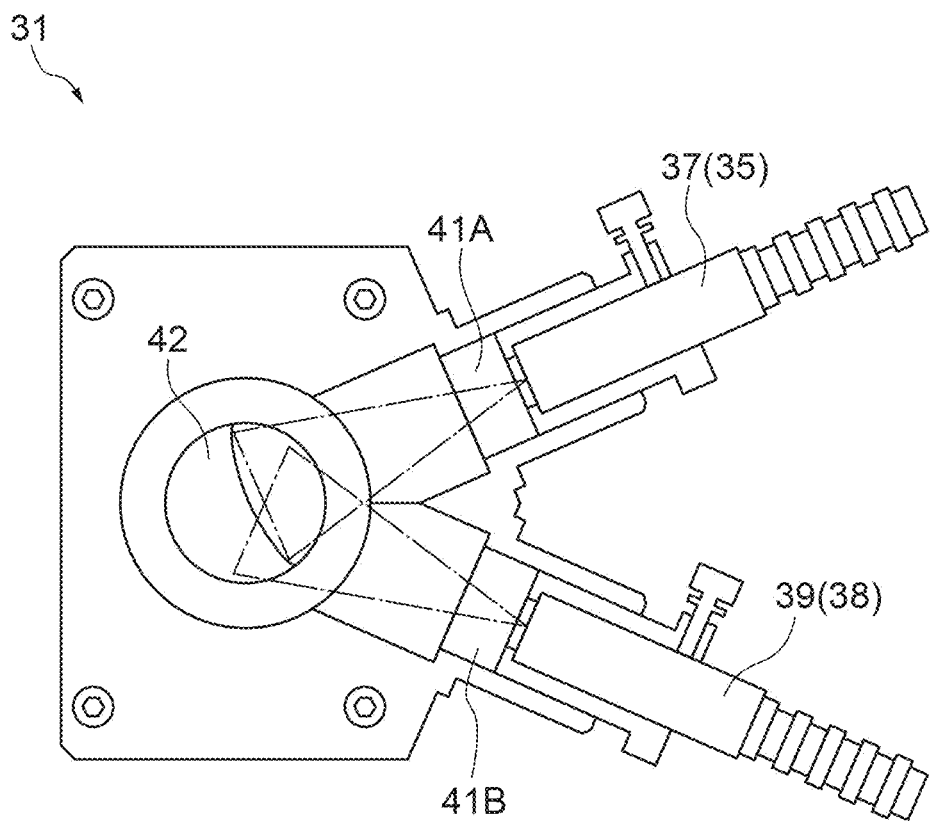
FIG. 6 is a schematic view showing an example of a configuration of a switching unit.

The switching unit 31 is a portion that optically connects one of the first detection optical system 7 and the second detection optical system 8 to the light detector 6. The switching unit 31 includes, for example, a pair of light guides 41A and 41B and an off-axis parabolic mirror 42, as shown in FIG. 6. The light detector input end 35 (the bundle fiber 37) on a side of the first detection optical system 7 is optically connected to the light guide 41A. The light detector input end 38 (the bundle fiber 39) on a side of the second detection optical system 8 is optically connected to the light guide 41B. The direction of the reflecting surface of the off-axis parabolic mirror 42 is variable by a driving means such as a stepping motor. Since the off-axis parabolic mirror 42 is optically coupled to one of the light guides 41A and 41B, only one of the excitation light L1 from the light guide 41A and the excitation light L1 from the light guide 41B is guided toward the light detector 6.

The arithmetic unit 12 is a portion that calculates the external quantum efficiency and the internal quantum efficiency of the subject to be measured S on the basis of the signal output from the light detector 6. Physically, the arithmetic unit 12 is a computer system that includes a memory such as RAM and ROM, a processor (an arithmetic circuit) such as a CPU, a communication interface, a storage unit such as a hard disk, and a display unit such as a display. Examples of the computer system include a personal computer, a cloud server, a smart device (a smartphone, a tablet terminal, or the like), and the like. The arithmetic unit 12 may be constituted by a programmable logic controller (PLC), or may be constituted by an integrated circuit such as a field-programmable gate array (FPGA).

In the standard PL spectrum measurement, the arithmetic unit 12 generates measurement data of the standard PL spectrum on the basis of the signal output from the light detector 6 and stores the measurement data of the standard PL spectrum in the storage unit. In the external quantum efficiency measurement, the arithmetic unit 12 calculates the external quantum efficiency of the subject to be measured S on the basis of the signal (the measurement signal and the reference signal) output from the light detector 6 and stores the calculation data of the external quantum efficiency in the storage unit. Further, the arithmetic unit 12 calculates the internal quantum efficiency of the subject to be measured S on the basis of the measurement data of the standard PL spectrum and the calculation data of the external quantum efficiency and stores the calculation data of the internal quantum efficiency in the storage unit. The arithmetic unit 12 may output the measurement data of the standard PL spectrum, the calculation data of the external quantum efficiency, and the calculation data of the internal quantum efficiency which are obtained to a monitor or the like.

Procedure for Executing ODPL Measurement Using Measuring Device

Figure 7:
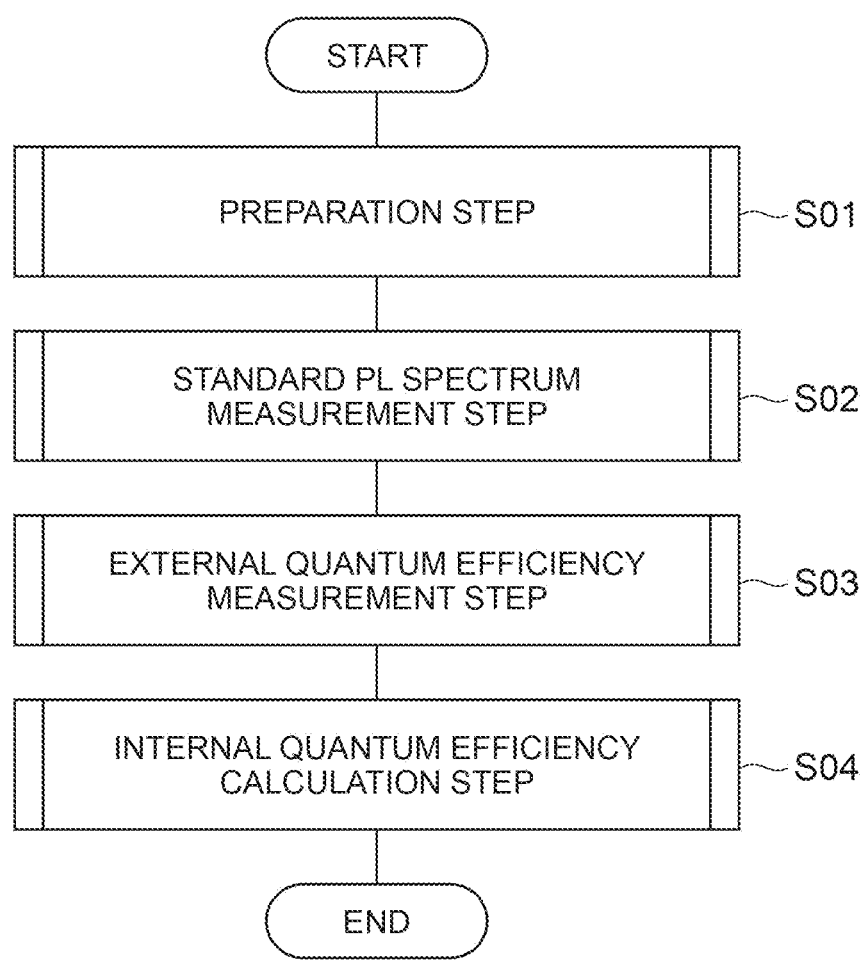
FIG. 7 is a flowchart of ODPL measurement using the measuring device shown in FIG. 1.

FIG. 7 is a flowchart of ODPL measurement using the measuring device. As shown in FIG. 7, in ODPL measurement using the measuring device 1, a preparation step (step S01), a standard PL spectrum measurement step (step S02), an external quantum efficiency measurement step (step S03), and an internal quantum efficiency calculation step (step S04) are executed in that order.

Figure 8:
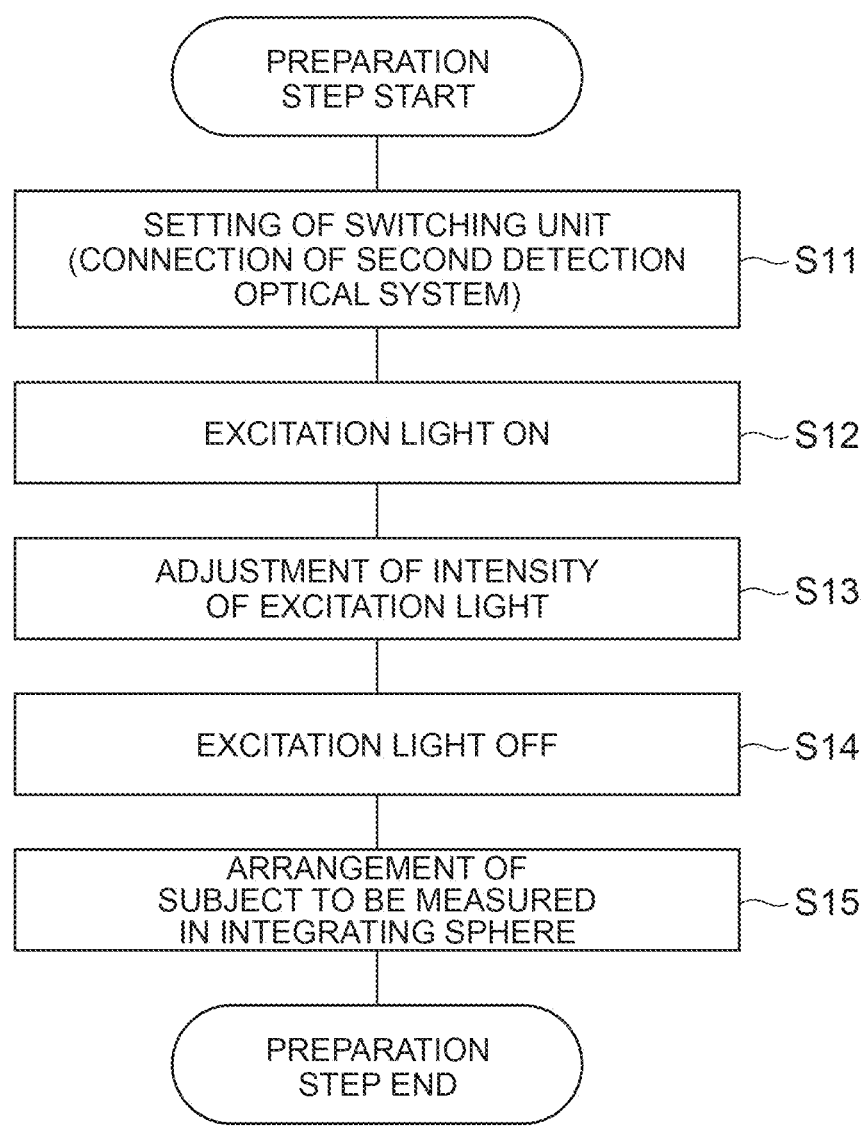
FIG. 8 is a flowchart of a preparation step.

In the preparation step S01, as shown in FIG. 8, first, setting of the switching unit 31 is performed (step S11). Here, the off-axis parabolic mirror 42 of the switching unit 31 is driven to optically connect the second detection optical system 8 to the light detector 6. Next, the excitation light L1 is output from the excitation light source 2 (step S12), and adjustment of the intensity of the excitation light L1 is performed (step S13). The adjustment of the intensity of the excitation light L1 is executed by adjusting the variable attenuation filter 16 or the variable attenuation filter incorporated in the light detector 6 such that the light output from the integrating sphere 4 through the incidence of the excitation light L1 does not saturate in the light detector 6. After the adjustment of the intensity of the excitation light L1, the output of the excitation light L1 is stopped (step S14). Then, the subject to be measured S is held after the arm 23 of the XY stage 5 is removed from the integrating sphere 4, and the subject to be measured S is disposed in the integrating sphere 4 while being held by the arm 23 (step S15).

Figure 9:
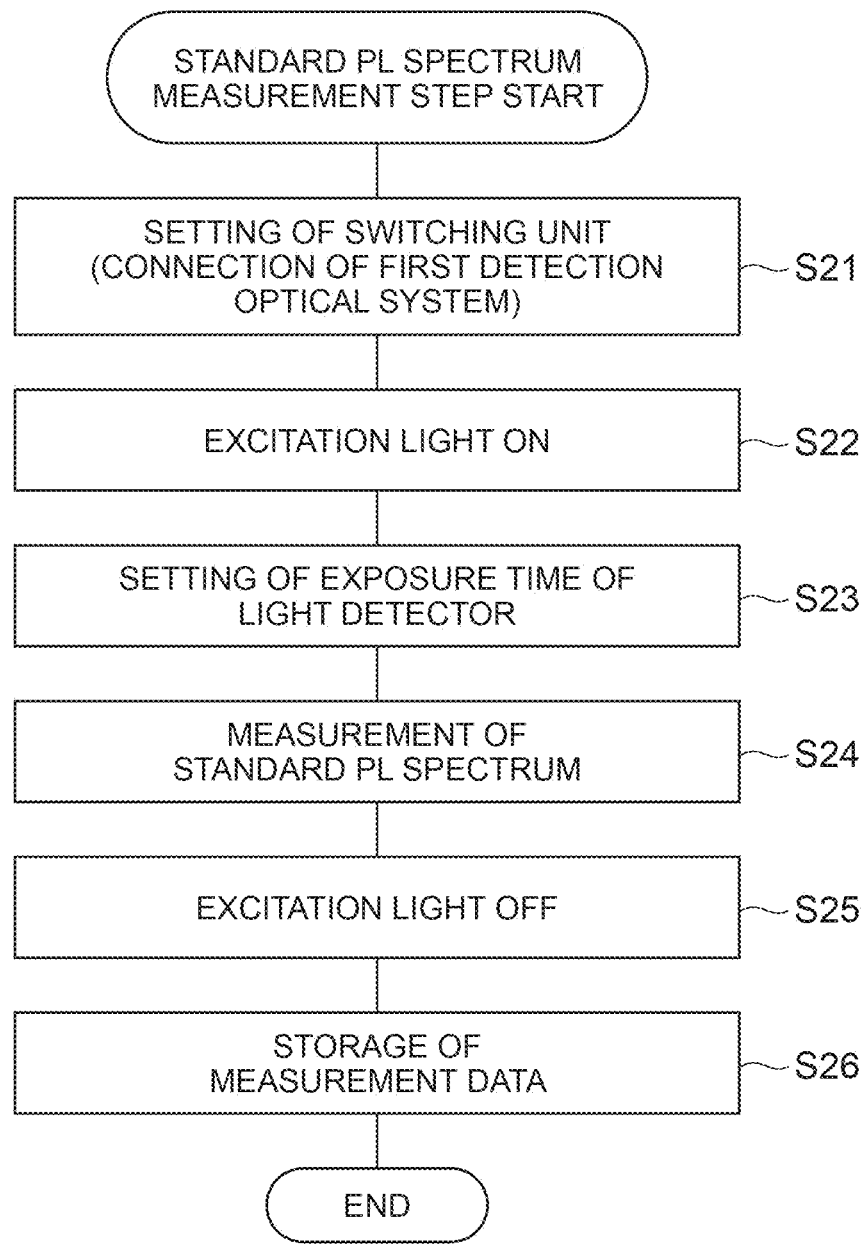
FIG. 9 is a flowchart of a standard PL spectrum measurement step.

In the standard PL spectrum measurement step S02, as shown in FIG. 9, first, setting of the switching unit 31 is performed (step S21). Here, the off-axis parabolic mirror 42 of the switching unit 31 is driven to optically connect the first detection optical system 7 to the light detector 6. Next, the excitation light L1 is output from the excitation light source 2 and the excitation light L1 is incident on the subject to be measured S in the integrating sphere 4 (step S22), and setting of the exposure time of the light detector 6 is performed (step S23). After the exposure time of the light detector 6 is set, the light to be measured L2 output from the first port 24 of the integrating sphere 4 through the irradiation with the excitation light L1 is guided to the light detector 6 by the first detection optical system 7, and the standard PL spectrum measurement of the subject to be measured S is executed (step S24). After the measurement is completed, the output of excitation light is stopped (step S25), and the measurement data is stored (step S26).

Figure 10:
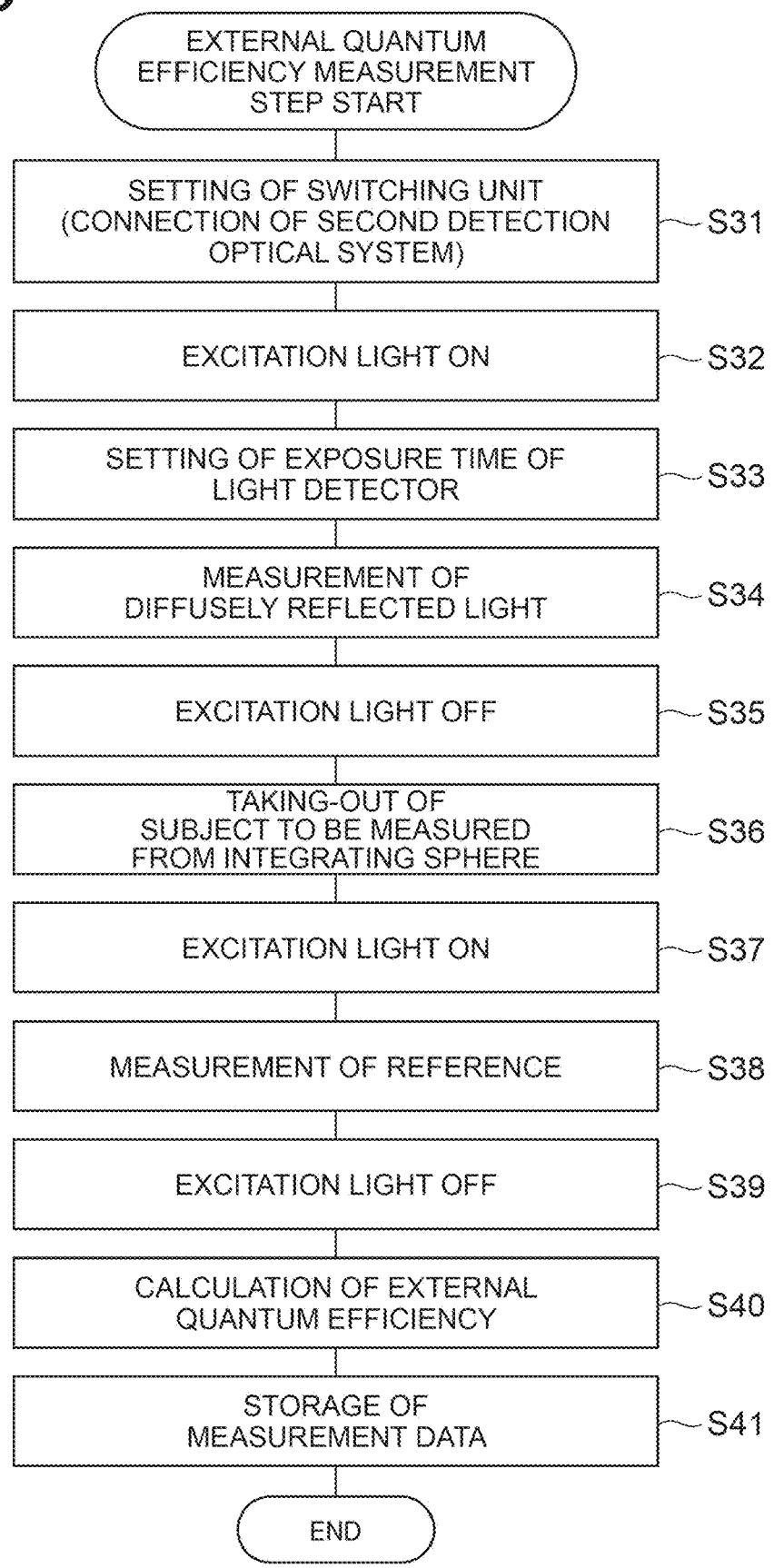
FIG. 10 is a flowchart of an external quantum efficiency measurement step.

In the external quantum efficiency measurement step S03, as shown in FIG. 10, first, setting of the switching unit 31 is performed (step S31). Here, the off-axis parabolic mirror 42 of the switching unit 31 is driven to optically connect the second detection optical system 8 to the light detector 6. Next, the excitation light L1 is output from the excitation light source 2 and the excitation light L1 is incident on the subject to be measured S in the integrating sphere 4 (step S32), and setting of the exposure time of the light detector 6 is performed (step S33). After the exposure time of the light detector 6 is set, the light to be measured L2 output from the second port 25 of the integrating sphere 4 through the irradiation with the excitation light L1 is guided to the light detector 6 by the second detection optical system 8, and the measurement of the diffusely reflected light is executed (step S34). After the measurement is completed, the output of excitation light L1 is stopped (step S35), and the subject to be measured S is taken out from the integrating sphere 4 (step S36).

After the subject to be measured S is taken out, the output of the excitation light L1 is started again (step S37), and reference measurement is executed (step S38). In the reference measurement, in a state where the subject to be measured S is not disposed in the integrating sphere 4, the light to be measured L2 output from the second port 25 of the integrating sphere 4 is guided to the light detector 6 by the second detection optical system 8, and the measurement of the diffusely reflected light is executed (step S38). After the measurement is completed, the output of the excitation light L1 is stopped (step S39). After that, on the basis of the measurement result of step S34 and the measurement result of step S38, the ratio of the number of luminescence photons emitted to the outside of the subject to be measured S to the number of photons of the excitation light L1 absorbed by the subject to be measured S is calculated. As a result, the external quantum efficiency of the subject to be measured S is calculated (step S40), and the calculation data is stored (step S41).

Figure 11:
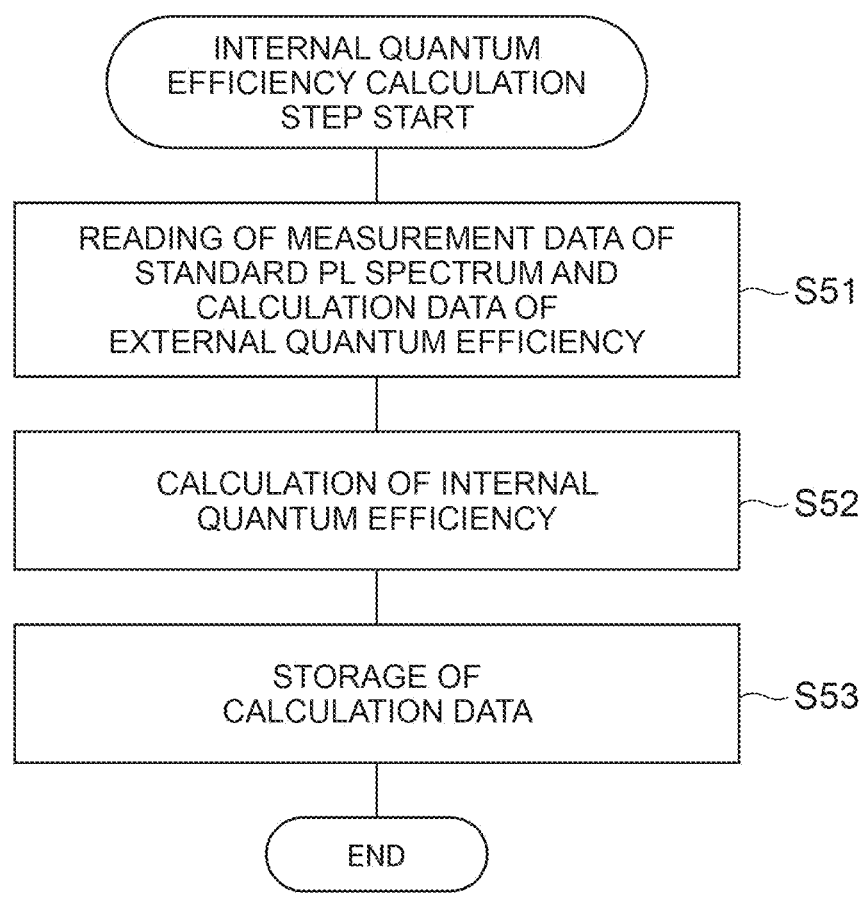
FIG. 11 is a flowchart of an internal quantum efficiency calculation step.

In the internal quantum efficiency calculation step S04, as shown in FIG. 11, the measurement data of the standard PL spectrum measurement stored in step S26 and the calculation data of the external quantum efficiency stored in step S41 are read (step S51). Next, the internal quantum efficiency of the subject to be measured S is calculated on the basis of the measurement data of the read standard PL spectrum measurement, the read calculation data of the external quantum efficiency, and the light extraction efficiency of the subject to be measured S which is known according to the material (step S52). The calculation data is stored, and the process is completed (step S53).

Operation and Effect of Measuring Device

As described above, in the measuring device 1, the optical axis of the excitation light L1 incident on the subject to be measured S in the integrating sphere 4 in the excitation optical system 3 and the optical axis of the light to be measured L2 that is emitted from the integrating sphere 4 in the first detection optical system 7 obliquely intersect with each other. As a result, the excitation light L1 reflected by the subject to be measured S in the integrating sphere 4 can be prevented from being directly detected by the light detector 6. Further, in this measuring device 1, the irradiation spot La of the excitation light L1 on the subject to be measured S disposed in the integrating sphere 4 and the opening portion 36 disposed in the first detection optical system 7 are in an optically conjugate relationship. As a result, the influence of multiple scattering within the integrating sphere 4 can be suppressed, and only the light to be measured L2 generated on the surface of the subject to be measured S through the incidence of the excitation light L1 can be extracted from the integrating sphere 4 to be detected. Therefore, in the measuring device 1, it is possible to execute the measurement of the standard PL spectrum of the subject to be measured S in a state where the subject to be measured S is disposed in the integrating sphere 4.

In the present embodiment, the excitation light L1 directed toward the subject to be measured S by the excitation optical system 3 and the light to be measured L2 generated at the subject to be measured S in the integrating sphere 4 pass through the same first port 24 of the integrating sphere 4. In this case, it becomes easy to share the optical components constituting the excitation optical system 3 and the first detection optical system 7, and it is possible to achieve the simplification and miniaturization of the device.

In the present embodiment, the measuring device 1 further includes the second detection optical system 8 that guides the light to be measured L2 diffusely reflected in the integrating sphere 4 from the integrating sphere 4 toward the light detector 6 and a switching unit 31 that optically connects one of the first detection optical system 7 and the second detection optical system 8 to the light detector 6. In this case, the second detection optical system 8 is used to guide the light to be measured L2 diffusely reflected in the integrating sphere 4 from the integrating sphere 4 toward the light detector 6, and thus it is possible to execute the measurement of the external quantum efficiency of the subject to be measured S using the integrating sphere 4. By switching the optical system connected to the light detector 6 by the switching unit 31, it is possible to execute the measurement of the standard PL spectrum and the measurement of the external quantum efficiency in the same device while maintaining the state where the subject to be measured S is disposed in the integrating sphere 4.

Modification Examples

Figure 12:
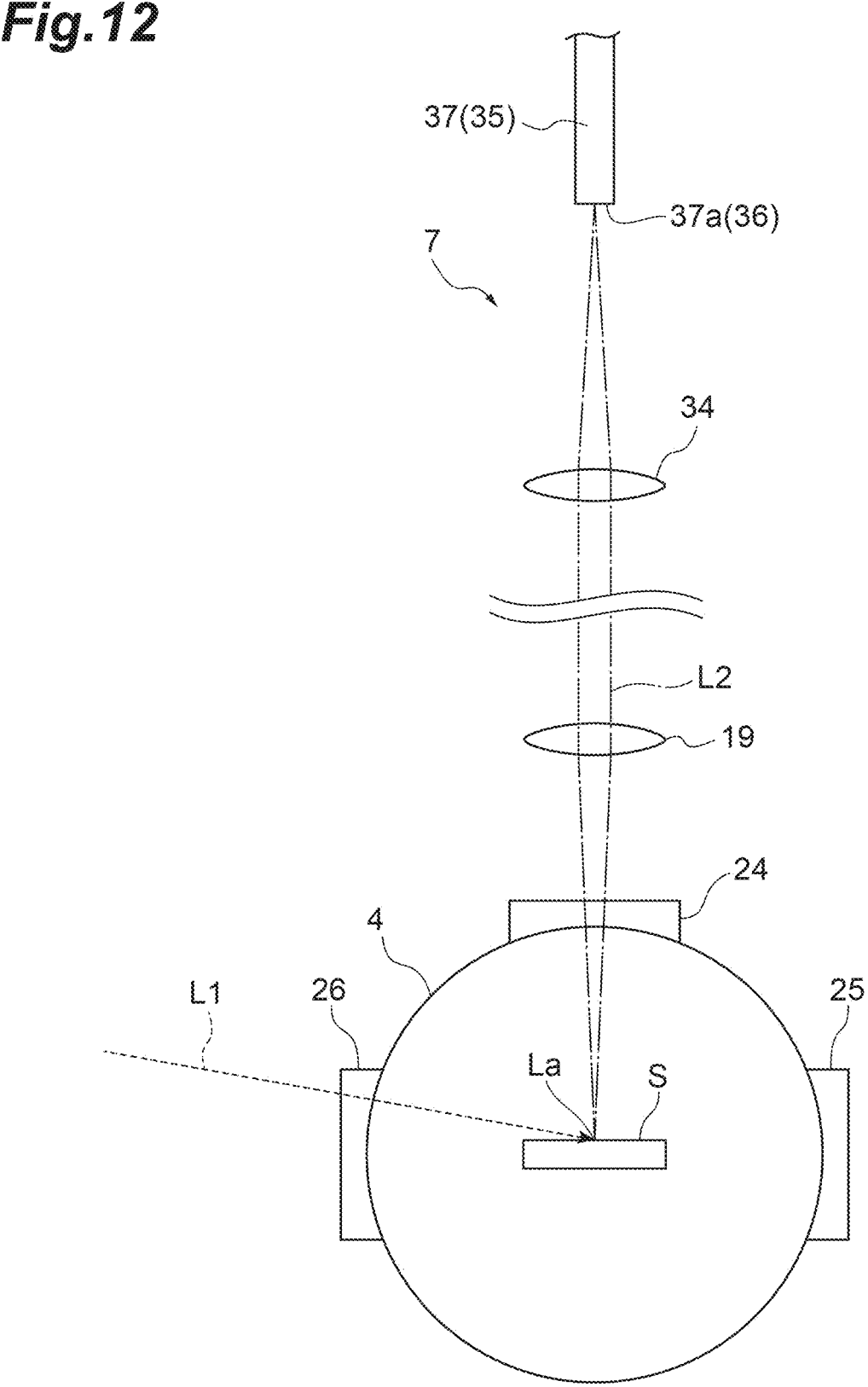
FIG. 12 is a schematic view showing a modification example of the optical connection state between the excitation optical system and the first detection optical system in the standard PL spectrum measurement.

The present disclosure is not limited to the above embodiment. For example, as shown in FIG. 12, the excitation light L1 and the light to be measured L2 may pass through different ports. In the example of FIG. 12, the integrating sphere 4 has a third port 26 (one port) in addition to the first port 24 and the second port 25. The third port 26 is provided on a side opposite to the second port 25. The third port 26 is orthogonal to the opening direction of the first port 24 and opens in a direction opposite to the opening direction of the second port 25.

In the present modification example, the excitation light L1 directed toward the subject to be measured S by the excitation optical system 3 passes through the third port 26 of the integrating sphere 4. The third port 26 may also serve as a port for introducing the arm 23 of the XY stage 5 (see FIG. 1) into the integrating sphere 4. Further, the light to be measured L2 generated at the subject to be measured S in the integrating sphere 4 passes through the first port 24 (another port) of the integrating sphere 4. According to such a configuration, it is easy to secure the oblique intersection angle of the optical axis of the excitation light L1 incident on the subject to be measured S in the integrating sphere 4 in the excitation optical system 3 and the optical axis of the light to be measured L2 that is emitted from the integrating sphere 4 in the first detection optical system 7. Therefore, the excitation light L1 reflected by the subject to be measured S in the integrating sphere 4 can be more reliably prevented from being directly detected by the light detector 6.

Figure 13:
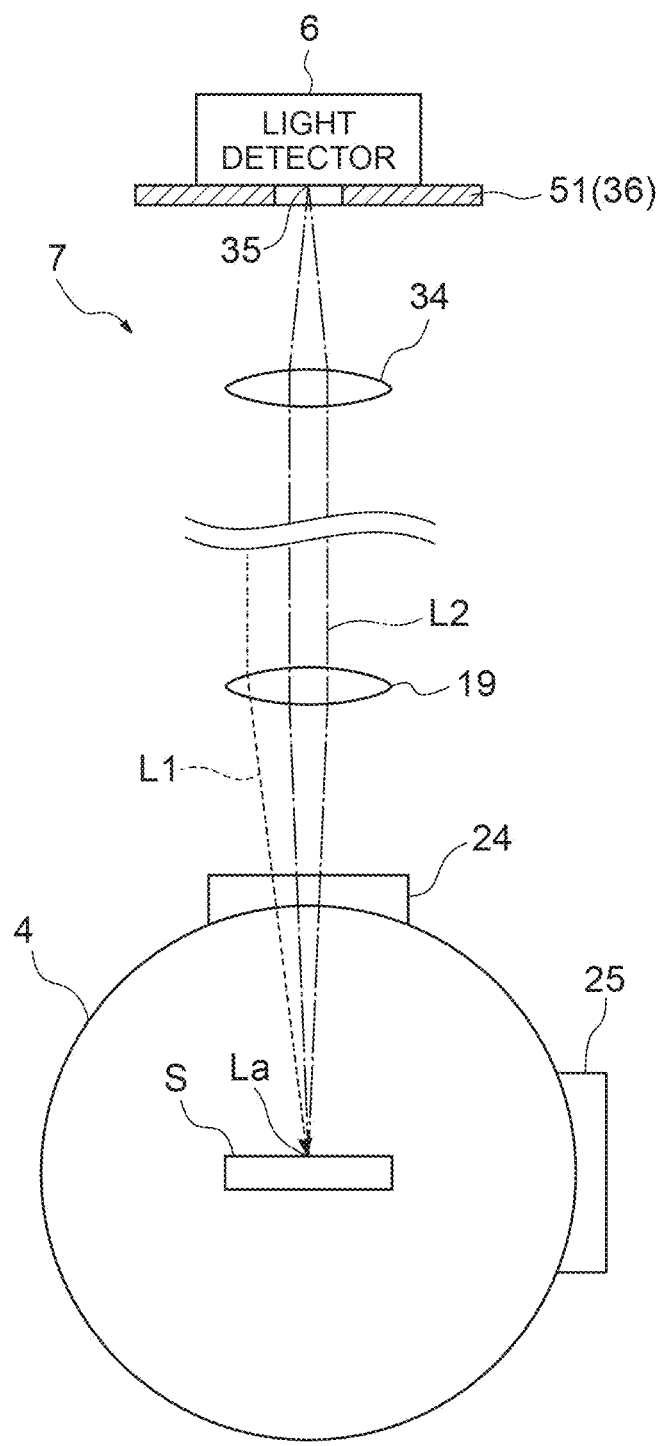
FIG. 13 is a schematic view showing another modification example of the optical connection state between the excitation optical system and the first detection optical system in the standard PL spectrum measurement.

Further, the opening portion 36 that limits the detection range of the light to be measured L2 in the light detector 6 does not necessarily have to be constituted by the end surface 37a of the bundle fiber 37. In the example of FIG. 13, the light detector input end 35 is provided directly to the light detector 6 without the bundle fiber 37 interposed therebetween, and the opening portion 36 that limits the detection range of the light to be measured L2 is constituted by a pinhole 51 disposed in contact with the light detector input end 35 of the light detector 6. Even with such a configuration, the irradiation spot La of the excitation light L1 on the subject to be measured S and the opening portion 36 can be in an optically conjugate relationship.

Figure 14:
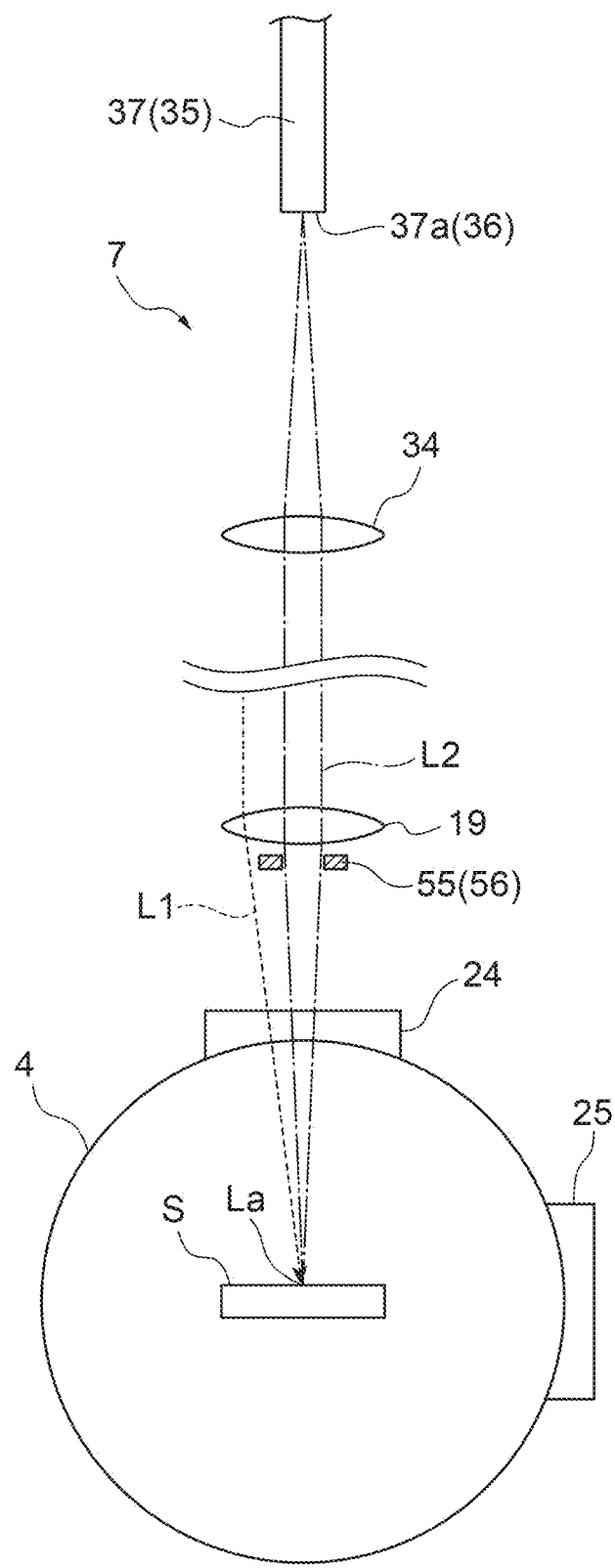
FIG. 14 is a schematic view showing an example of a blocking member disposed in a first detection optical system.

As shown in FIG. 14, the first detection optical system 7 has a blocking member 55 that blocks stray light of the light to be measured L2. In the example of FIG. 14, the blocking member 55 is constituted by a pinhole 56 disposed between the integrating sphere 4 and the lens 19 on the optical path of the light to be measured L2. With such a configuration, it is possible to prevent the stray light of the light to be measured L2 from affecting the optical components constituting the excitation optical system 3 and the first detection optical system 7.

Figure 15:
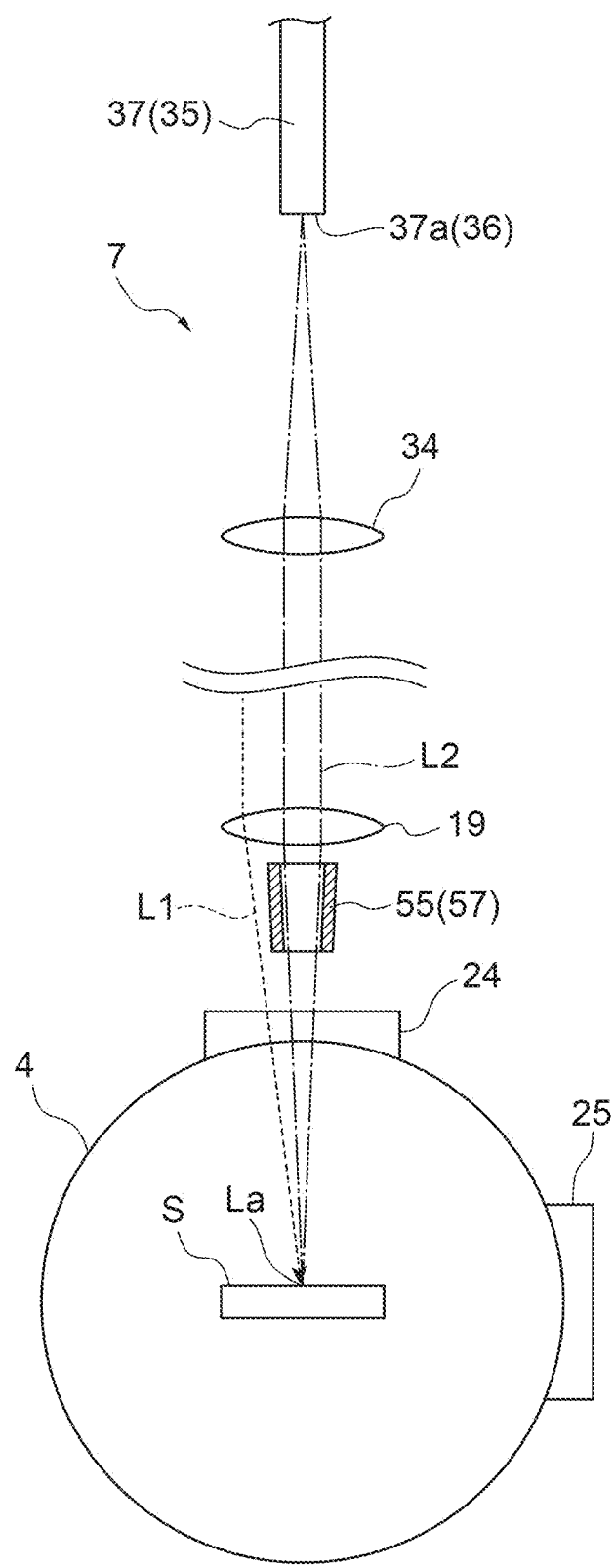
FIG. 15 is a schematic view showing another example of a blocking member disposed in a first detection optical system.

The blocking member 55 may be constituted by a cylindrical member 57, as shown in FIG. 15. In the example of FIG. 15, the cylindrical member 57 is, for example, a black truncated cone-shaped member and is disposed between the lens 19 and the integrating sphere 4 on the optical path of the light to be measured L2 to increase in diameter from a side of the integrating sphere 4 toward a side of the lens 19. The cylindrical member 57 may be in contact with the first port 24 of the integrating sphere 4 or may be separated therefrom. An anti-reflection coating that suppresses reflection of the light to be measured L2 may be applied to the inner side of the cylindrical member 57.

Figure 16:
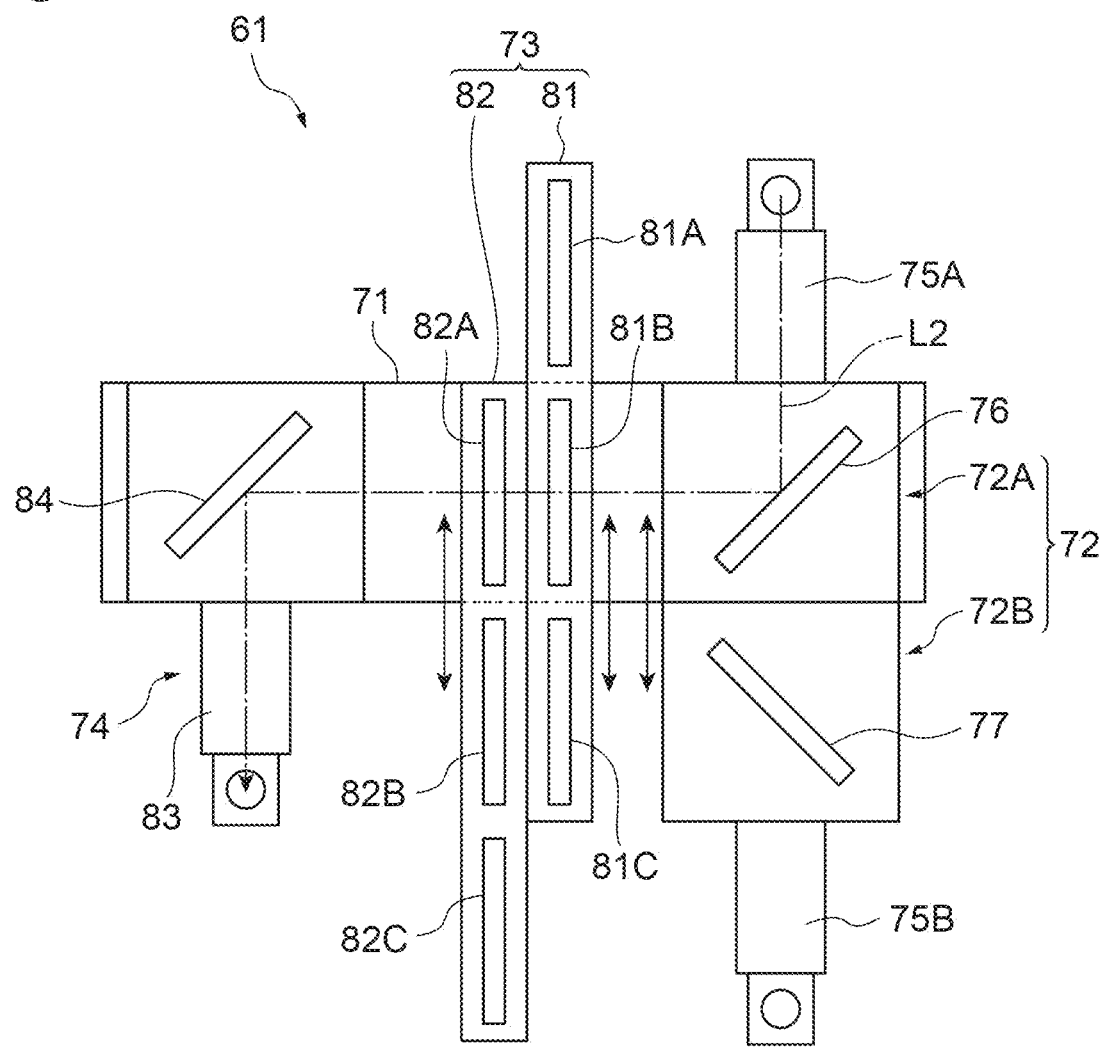
FIG. 16 is a schematic view showing another example of a configuration of a switching unit.

Further, the configuration of the switching unit 31 may also take other aspects. FIG. 16 is a schematic view showing another example of the configuration of the switching unit. The switching unit 61 according to the present modification example has a base unit 71, an input unit 72, a filter unit 73 (an attenuation element), and an output unit 74. The base unit 71 has a rectangular plate shape, for example, and extends in one direction from a side of the input units 72A and 72B toward a side of the output unit 74.

The input unit 72 is provided with a pair of input terminals 75A and 75B and a pair of mirrors 76 and 77. The light detector input end 35 (the bundle fiber 37) on a side of the first detection optical system 7 is optically connected to the input terminal 75A, and the light detector input end 38 (the bundle fiber 39) on a side of the second detection optical system 8 is optically connected to the input terminal 75B.

The filter unit 73 is disposed between the input unit 72 and the output unit 74. The filter unit 73 is constituted by a dimming filter unit 81 and a low-pass filter unit 82. The dimming filter unit 81 has, for example, three dimming filters 81A to 81C with different degrees of dimming. The low-pass filter unit 82 has, for example, three low-pass filters 82A to 82C with different cut wavelengths. The output unit 74 is provided with an output terminal 83 and a mirror 84. The output terminal 83 is optically connected to the light detector 6.

The input unit 72, the dimming filter unit 81, and the low-pass filter unit 82 are slidable, for example, in a direction orthogonal to an extending direction of the base unit 71. Through the sliding of the input unit 72, one of the mirror 76 and the mirror 77 is optically connected to the mirror 84 of the output unit 74. As a result, only one of the light to be measured L2 from the input terminal 75A and the light to be measured L2 from the input terminal 75B is guided toward the light detector 6.

Further, through the sliding of the dimming filter unit 81 and the low-pass filter unit 82, the dimming filters 81A to 81C and the low-pass filters 82A to 82C can be freely advanced and retracted on the optical axis of the light to be measured L2 between the input unit 72 and the output unit 74. As a result, the intensity of the light to be measured L2 output from the output terminal 83 can be adjusted in multiple stages, and the saturation of the light to be measured L2 at the light detector 6 can be preferably prevented.

REFERENCE SIGNS LIST

1 Measuring device
3 Excitation optical system
4 Integrating sphere
6 light detector
7 First detection optical system
8 Second detection optical system
24 First port (another port)
26 Third port (one port)
31, 61 Switching unit
36 Opening portion
55 Blocking member
57 Cylindrical member
73 Filter unit (attenuation element)
L1 Excitation light
L2 Light to be measured
La Irradiation spot
S Subject to be measured

The invention claimed is:

1. A measuring device comprising:
   an integrating sphere with a subject to be measured disposed therein;
   an excitation optical system configured to guide excitation light toward the subject to be measured disposed in the integrating sphere;
   a light detector configured to detect light to be measured generated at the subject to be measured in the integrating sphere through irradiation with the excitation light; and
   a first detection optical system configured to guide the light to be measured from the integrating sphere toward the light detector,
   wherein an optical axis of the excitation light incident on the subject to be measured in the integrating sphere in the excitation optical system and an optical axis of the light to be measured that is emitted from the integrating sphere in the first detection optical system obliquely intersect with each other,
   wherein the first detection optical system has a light detector input end, an end surface provided on the light detector input end, and an opening portion provided in a center of the end surface that limits a detection range of the light to be measured in the light detector, and
   wherein an irradiation spot of the excitation light on the subject to be measured and the opening portion are in an optically conjugate relationship.

2. The measuring device according to claim 1, wherein the excitation light directed toward the subject to be measured by the excitation optical system and the light to be measured generated at the subject to be measured in the integrating sphere pass through the same port of the integrating sphere.

3. The measuring device according to claim 1, wherein the excitation light directed toward the subject to be measured by the excitation optical system passes through one port of the integrating sphere, and the light to be measured generated at the subject to be measured in the integrating sphere passes through another port that is different from the one port of the integrating sphere.

4. The measuring device according to claim 1, wherein the first detection optical system has a blocking member that blocks stray light of the light to be measured.

5. The measuring device according to claim 4, wherein the blocking member is constituted by a cylindrical member.

6. The measuring device according to claim 1, further comprising:
 a second detection optical system configured to guide the light to be measured diffusely reflected in the integrating sphere from the integrating sphere toward the light detector; and
 a switching unit configured to optically connect one of the first detection optical system and the second detection optical system to the light detector.

7. The measuring device according to claim 6, wherein the switching unit includes an attenuation element disposed to move back and forth on the optical axis of the light to be measured.

* * * * *